United States Patent
Al-Salameh et al.

(10) Patent No.: US 6,634,807 B1
(45) Date of Patent: Oct. 21, 2003

(54) OPTICAL TRANSMISSION SYSTEM INCLUDING PERFORMANCE OPTIMIZATION

(75) Inventors: Daniel Yousef Al-Salameh, Marlboro, NJ (US); David Stuart Levy, Freehold Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/525,188

(22) Filed: Mar. 14, 2000

(51) Int. Cl.⁷ .............................................. H04B 10/08
(52) U.S. Cl. ................. 398/9; 398/15; 398/10
(58) Field of Search .................. 359/110, 124, 359/127, 153, 161, 167, 177, 187; 398/9, 79, 82, 136, 158, 167.5, 177, 195

(56) References Cited

U.S. PATENT DOCUMENTS

| | | | |
|---|---|---|---|
| 5,812,710 A | | 9/1998 | Sugaya |
| 5,966,237 A | | 10/1999 | Sugaya et al. |
| 6,134,034 A | * | 10/2000 | Terahara ............... 359/124 |
| 6,229,631 B1 | * | 5/2001 | Sato et al. ............. 359/110 |
| 6,275,313 B1 | * | 8/2001 | Denkin et al. ......... 359/124 |
| 6,400,475 B1 | * | 6/2002 | Kosaka et al. ......... 359/110 |
| 6,449,068 B1 | * | 9/2002 | Turner et al. .......... 359/110 |
| 6,449,070 B1 | * | 9/2002 | Izumi .................... 359/124 |
| 6,452,719 B2 | * | 9/2002 | Kinoshita ............ 359/337.12 |

* cited by examiner

Primary Examiner—Leslie Pascal
Assistant Examiner—Dalzid Singh

(57) ABSTRACT

Vulnerability of an optical network to channel impairments or the like, is addressed by utilizing real-time monitoring and control of prescribed optical channel impairments. The impairments are compensated for by employing an optimization process in the optical network such that the optical signals from the source or sources of the impairments are controllably adjusted at any particular node in the network. The optical signals are attenuated more or less at the source node of the associated optical channel in order to optimize performance of the corresponding optical channel in the network. A variable optical attenuator (VOA) is used at the λ laser source of optical channel having the impairment to obtain the attenuation. The optical signal impairment is measured at a receiving node and the source node of the associated optical channel is determined. Then, a control message is transmitted to the identified source node indicating that a VOA associated with the corresponding optical channel λ laser source is to be adjusted to insert more or less attenuation as the case may be. This process is iterated until the corresponding optical channel yields optimum performance for the impairment being measured. A VOA in a remote node associated with the λ laser source of the associated optical channel is first adjusted. Then, a VOA in the local node associated with the optical channel being monitored is adjusted to further optimize the prescribed metric of the optical channel being monitored. This adjustment is iterated until the performance of the associated channel is optimized.

44 Claims, 7 Drawing Sheets

OPTICAL TRANSMISSION SYSTEM INCLUDING PERFORMANCE OPTIMIZATION

TECHNICAL FIELD

This invention relates to optical transmission systems and, more particularly, to performance optimization of optical channels in optical transmission systems.

BACKGROUND OF THE INVENTION

Optical transmission systems and, especially, those employing Wavelength Division Multiplexing (WDM) are desirable because they provide extremely wide bandwidths for communications channels. Each communications channel in the WDM transmission system carries a plurality of optical channels, i.e., wavelengths, on a single optical fiber and single optical repeater. However, there is a trade off between providing wider bandwidth communications channels, with their lower cost of transport, and their vulnerability to channel impairments or the like that corrupt the quality of transmission. Therefore, the ability of an optical transmission system, for example, those employing WDM, to minimize the effects of channel impairments and other signal corrupting mechanisms on the optical communications services is extremely important.

SUMMARY OF THE INVENTION

Vulnerability of an optical network to channel impairments or the like, is addressed by utilizing real-time monitoring and control of one or more prescribed optical channel impairments. The one or more impairments are compensated for by employing an optimization process in the optical network such that the optical signals from the source or sources of the impairments are controllably adjusted at any particular node in the network. In a specific embodiment of the invention, the optical signals are attenuated more or less at the source node of the associated optical channel, e.g., wavelength λ, in order to optimize performance of the corresponding optical channel in the network. This is realized by employing a variable optical attenuator at the λ laser source of optical channel having the impairment.

More specifically, in a particular embodiment of the invention, the optical signal impairment is measured at a receiving node and the source node of the associated optical channel is determined. Then, a control message is transmitted to the identified source node indicating that a variable optical attenuator associated with the corresponding optical channel light source, e.g., λ laser source, is to be adjusted to insert more or less attenuation as the case may be. This measurement and adjustment process is iterated until the corresponding optical channel yields optimum performance for the impairment being measured. In this embodiment of the invention, the control messages are transmitted in an optical supervisory channel.

In another embodiment of the invention, a VOA in a remote node associated with the λ laser source of the associated optical channel is first adjusted. Thereafter, if necessary, a VOA in the local node associated with the optical channel being monitored is adjusted to further optimize the prescribed metric of the optical channel being monitored. This adjustment of the local VOA is iterated until the performance of the associated channel is optimized.

In still another embodiment of the invention, either a VOA in a remote node associated the λ laser source of the associated optical channel adjusted or a VOA at a local node associated with the received prescribed optical channel is adjusted or both VOAs are adjusted depending on an evaluation of the prescribed metric of the prescribed optical channel to optimize the prescribed metric of the prescribed optical channel.

In yet another embodiment of the invention a VOA in a remote node associated the λ laser source of the associated optical channel adjusted and a VOA at a local node associated with the received prescribed optical channel are substantially simultaneously adjusted to optimize the prescribed metric of the prescribed optical channel.

A technical advantage of the invention is that the transmission performance of the one or more optical channels is optimizes in substantially real time.

DETAILED DESCRIPTION

Figure 1:
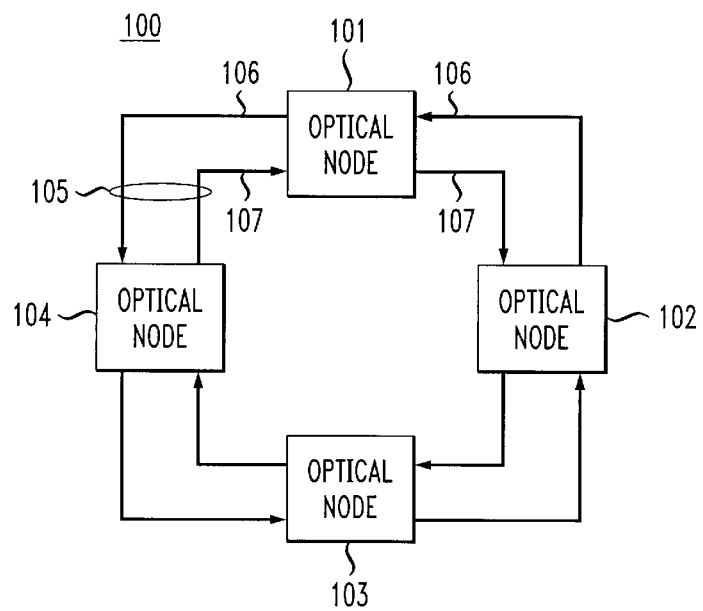
FIG. 1 illustrates, in simplified block form, details of an optical ring transmission system.

FIG. 1 shows, in simplified form, bi-directional optical transmission system 100, which is connected in a ring configuration. For brevity and clarity of exposition optical transmission system 100 is shown as including only optical nodes 101 through 104, each incorporating an embodiment of the invention. Optical nodes 101 through 104 are interconnected by bi-directional optical transmission medium 105, which for brevity and clarity of exposition, in this example, transport active service transmission capacity. In this example, optical transmission medium 105 is comprised of optical fibers 106 and 107. It should be noted that bidirectional optical transmission system 100 typically would employ either a two (2) optical fiber or a four (4) optical fiber system. In a preferred embodiment of the invention, transmission medium 105 includes two (2) optical fibers, fiber 106 and fiber 107 that are employed for transporting optical channels, i.e., wavelengths, and also protection optical channels. The optical transmission system 100 could transport, for example, 8, 16, 32, 40, 80, etc. communications channels, i.e., wavelengths. It should also be noted that in either the two (2) optical fiber arrangement or the four (4) optical fiber arrangement a separate so-called telemetry, e.g., supervisory, channel could be employed as a maintenance channel, in addition to the communications channels. Thus, in an eight (8) channel system, nine (9) channels are transported, in a 16 channel system, 17 channels are transported and so on. The supervisory channel provides maintenance support of the optical network including optical nodes 102 through 104, as well as, optimization information for use in nodes 101 though 104 to optimize transmission over the optical wavelengths in optical transmission system 100. Use of the supervisory channel in transporting the optimization information in order to optimize of the optical wavelengths in optical transmission system 100 is described below. Additionally, the maintenance information, as well as, he optimization information could be transported in-band in the channel overhead. Indeed, so long as the desired information is appropriating supplied it does not really matter what medium is employed to transport it, in-band, out-of-band, telemetry channel, supervisory channel, channel overhead, or the like. Two (2) and four (4) optical fiber transmission systems are known.

Figure 2:
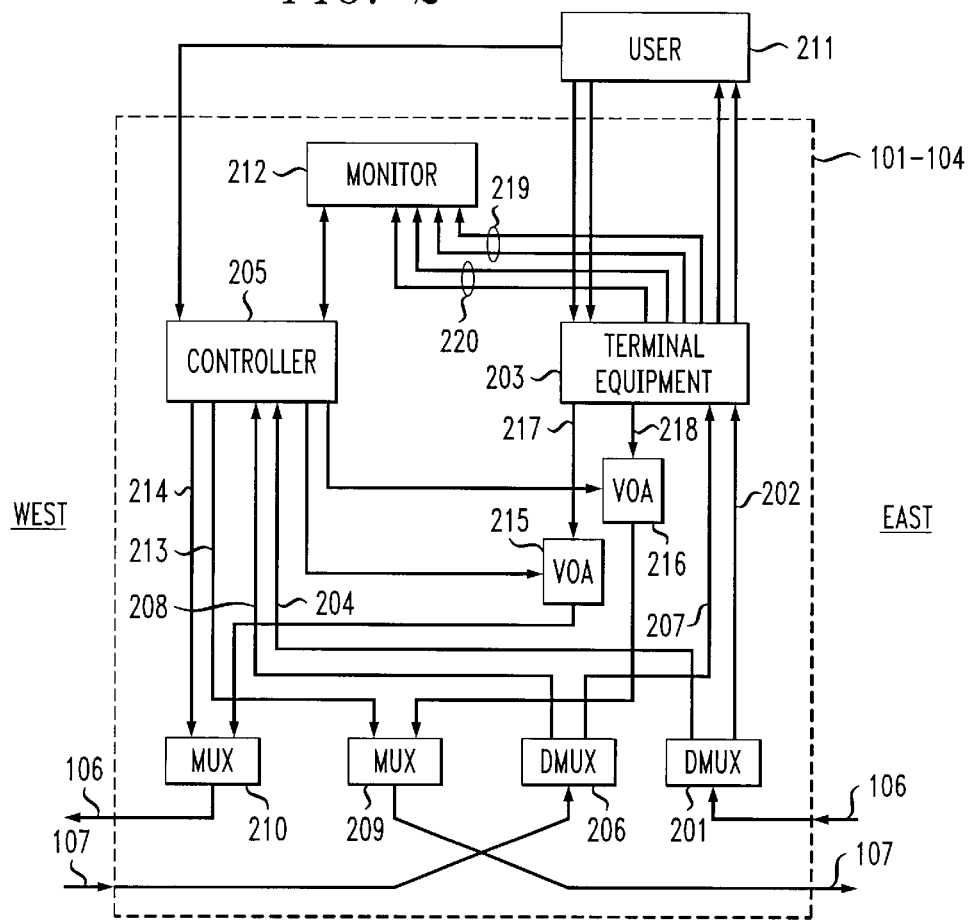
FIG. 2 illustrates, in simplified block diagram form, details of an optical node, including an embodiment of the invention, that may be employed in the system of FIG. 1.

FIG. 2 illustrates, in simplified block diagram form, details of individual ones of optical nodes 101–104, each including an embodiment of the invention, that may be employed in the system of FIG. 1. At the outset it is noted that for simplicity and clarity of exposition this embodiment will be described in terms of one optical channel, i.e., wavelength, for each direction of transmission. However, it will be apparent that the invention is equally applicable to a plurality of optical channels, i.e., wavelengths, being received and transmitted to and from the optical node. Specifically, an optical signal received from the east via optical fiber 106 is supplied to optical demultiplexer (DMUX) 201. The received optical signal is a wave division multiplexed (WDM) optical signal and typically includes a set of N wavelengths (λs), wherein N=0, 1, ... N, and an optical supervisory channel. Such WDM optical signals including an optical supervisory channel are well known in the art. A demultiplexed λ of the received optical signal from DEMUX 201 is supplied via optical path 202 to terminal equipment 203, while the demultiplexed optical supervisory channel is supplied via optical path 204 to controller 205. A multiplexed optical signal to be supplied as an output to the east is supplied from optical multiplexer (MUX) 209 to east bound optical fiber 107. Similarly, an optical signal received from the west via optical fiber 107 is supplied to optical demultiplexer (DMUX) 206. Again, the received optical signal is a wave division multiplexed (WDM) optical signal and typically includes a set of N wavelengths (λs), wherein N=0, 1, ... and an optical supervisory channel. A demultiplexed x of the received optical signal is supplied from DMUX 206 via optical path 207 to terminal equipment 203, while the demultiplexed optical supervisory channel is supplied via optical path 208 to controller 205. A multiplexed optical signal to be supplied as an output to the west is supplied from optical multiplexer (MUX) 210 to west bound optical fiber 106.

Figure 3:
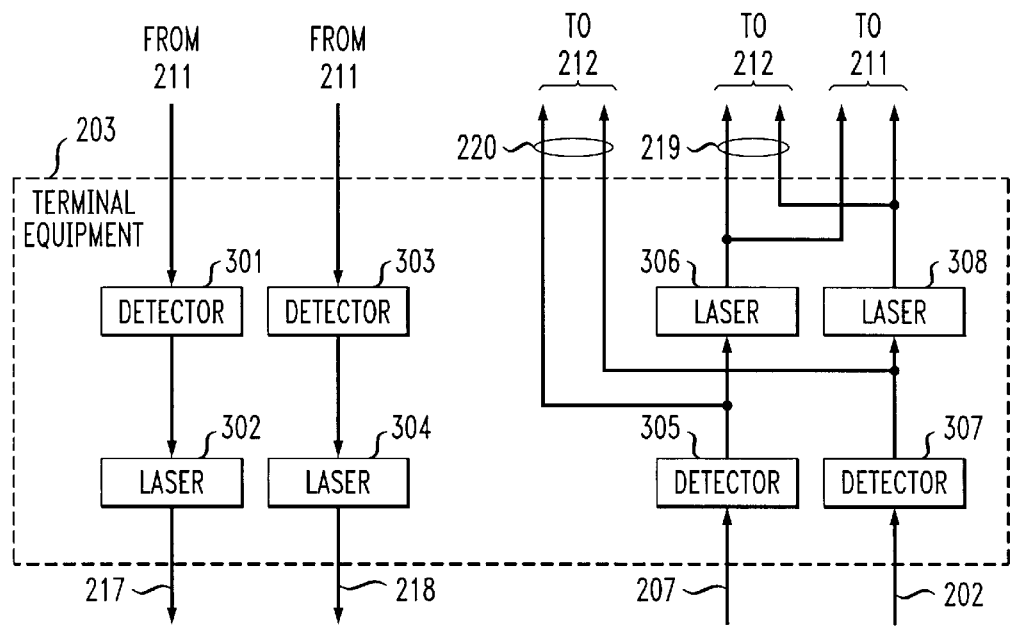
FIG. 3 shows, in simplified block diagram form details of a terminal equipment unit that may be employed in the optical nodes of FIG. 2 and FIG. 6.
Figure 4:
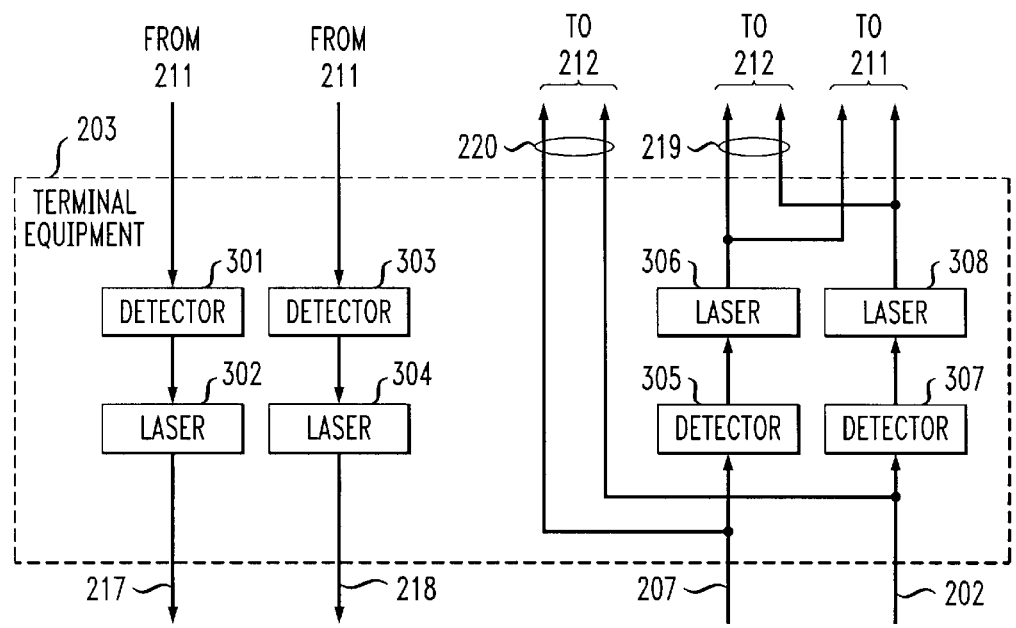
FIG. 4 shows, in simplified block diagram form details of another terminal equipment unit that may be employed in the optical nodes of FIG. 2 and FIG. 6.

User unit 211 receives detected received signals from terminal equipment 203 and supplies signals to be transported over the optical network to terminal equipment 203. Details of terminal equipment 203 are shown in FIGS. 3 and 4 and described below. Terminal equipment also supplies versions of the received optical signals to monitor 212. Monitor 212 includes apparatus for obtaining measures of prescribed signal transmission metrics, for example, bit-error-rate (BER), signal-to-noise ratio, cross talk, or the like. Arrangements for obtaining measurement of such metrics are well known in the art. For example, cross talk may be evaluated by employing an optical spectrum analyzer to observe a desired optical channel, i.e., wavelength, and an adjacent optical channel, i.e., wavelength. The results of these measurements are supplied from monitor 212 to controller 205 where they are included in a control message to be included in a supervisory channel for transmission to a node including the source of the corresponding optical channel that is being monitored. The optical supervisory channel including the resulting control message is supplied via path 213 to MUX 209 where it is multiplexed with other optical channels to be supplied to east bound optical fiber 107. Similarly, the optical supervisory channel including the resulting control message is supplied via path 214 to MUX 210 where it is multiplexed with other optical channels to be supplied to west bound optical fiber 106. The supervisory channel including the control message of the optical channel being monitored is demultiplexed at a node including the source of the optical channel. Utilizing the instant node for purposes of explanation, the incoming WDM optical signal including an optical supervisory channel from the east is demultiplexed in DEMUX 201 and the control message is supplied via path 204 to controller 205. Similarly, an incoming optical WDM optical signal including an optical supervisory channel from the west is demultiplexed in DEMUX 206 and the control message is supplied via path 208 to controller 205. In response to the supplied control messages controller 205 supplies corresponding control messages to each of variable optical attenuators 215 and 216. Variable optical attenuators 215 and 216 are adjusted accordingly and, consequently, optical channels signals supplied from terminal equipment 203 are attenuated more or less as indicated by the supplied control messages. A corresponding adjusted optical channel is supplied from VOA 215 to multiplexer (MUX) 210 to be multiplexed with the optical supervisory channel including the VOA control message from controller 205 for transmission in the west bound direction over optical fiber 106. Similarly, a corresponding adjusted optical channel is supplied from VOA 216 to multiplexer (MUX) 209 to be multiplexed with the optical supervisory channel including the VOA control message from controller 205 for transmission in the east bound direction over optical fiber 107.

The above described performance optimization process of monitoring a particular optical channel, generating a VOA control message, transmitting the control message, in this example, over the optical supervisory channel to a source node including the source of the optical channel being monitored, and adjusting the VOA at the source node is iterated until the performance of the optical channel being monitored has been optimized. Indeed, the transmission performance of the one or more optical channels is thereby optimized in substantially real time. This performance optimization process for the embodiment shown in FIG. 2 is shown in FIG. 5 and described below.

Figure 6:
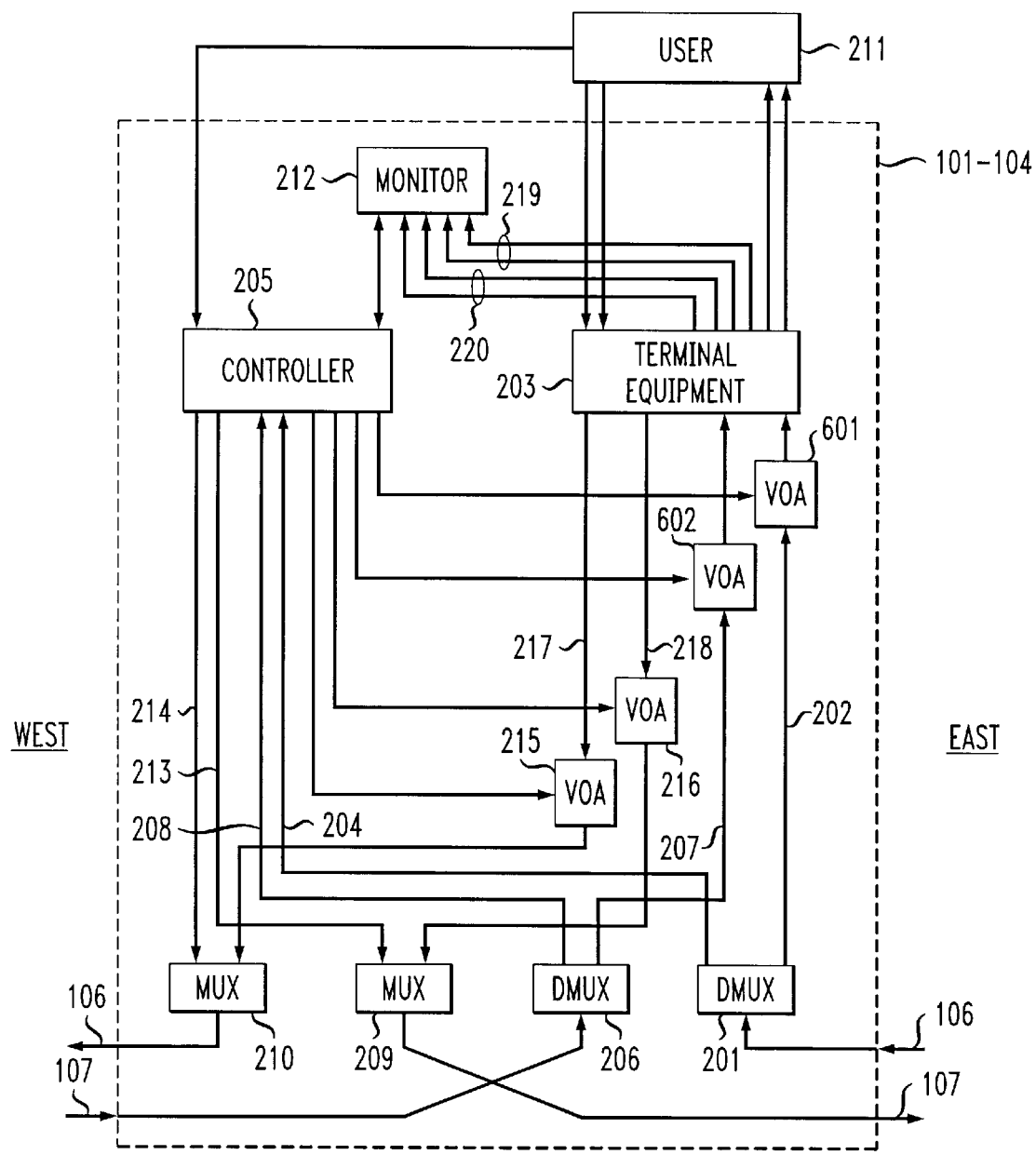
FIG. 6 illustrates, in simplified block diagram form, details of another optical node, including an embodiment of the invention, that may be employed in the system of FIG. 1.

FIG. 3 shows, in simplified block diagram form details of a terminal equipment unit 203 that may be employed in the optical nodes of FIG. 2 and FIG. 6. Specifically, shown are detectors 301 and 303 that are supplied optical signals from user unit 211. These optical signals are a prescribed wavelength employed by user unit 211. Detectors 301 and 303 convert the optical signals from user unit 211 into electric signals. The electrical signals from detectors 301 and 303, in turn are supplied to drive lasers 302 and 304, respectively, to yield appropriately modulated optical signals at the optical channel wave length λ v that are supplied via paths 217 and 218 to VOA 215 and VOA 216, respectively. Also shown, are detectors 303 and 304 that detect optical signals supplied via paths 207 and 208, respectively, at the optical channel λ to yield electrical versions thereof. These detected electrical signals from detectors 303 and 304 are supplied to drive lasers 306 and 308, respectively, and are also supplied via path 220 to monitor 212. The optical signal outputs from lasers 306 and 308 are at a prescribed wavelength expected by user unit 211 and are supplied to user unit 211 and via path 219 to monitor 212.

FIG. 4 shows, in simplified block diagram form details of another terminal equipment unit 203 that may be employed in the optical nodes of FIG. 2 and FIG. 6. Equipment elements that are the same as those shown and described above in relationship to FIG. 3 have been similarly numbered and will not be described in detail again. The differences being the equipment arrangement shown in FIG. 3 and that shown in FIG. 4 is that the optical channel signals supplied via paths 202 and 207 are supplied directly via path 220 to monitor 212, and the electrical signal outputs from detectors 305 and 307 are not shown as being supplied to monitor 212. This allows for monitoring the optical channel signals directly in optical form. This may be done, in one example, by employing an optical spectrum analyzer or other optical metric measuring equipment. It should be noted, however, that the electrical signal outputs form detectors 305 and 307 may also be supplied to monitor 212 in other implementations.

Figure 5:
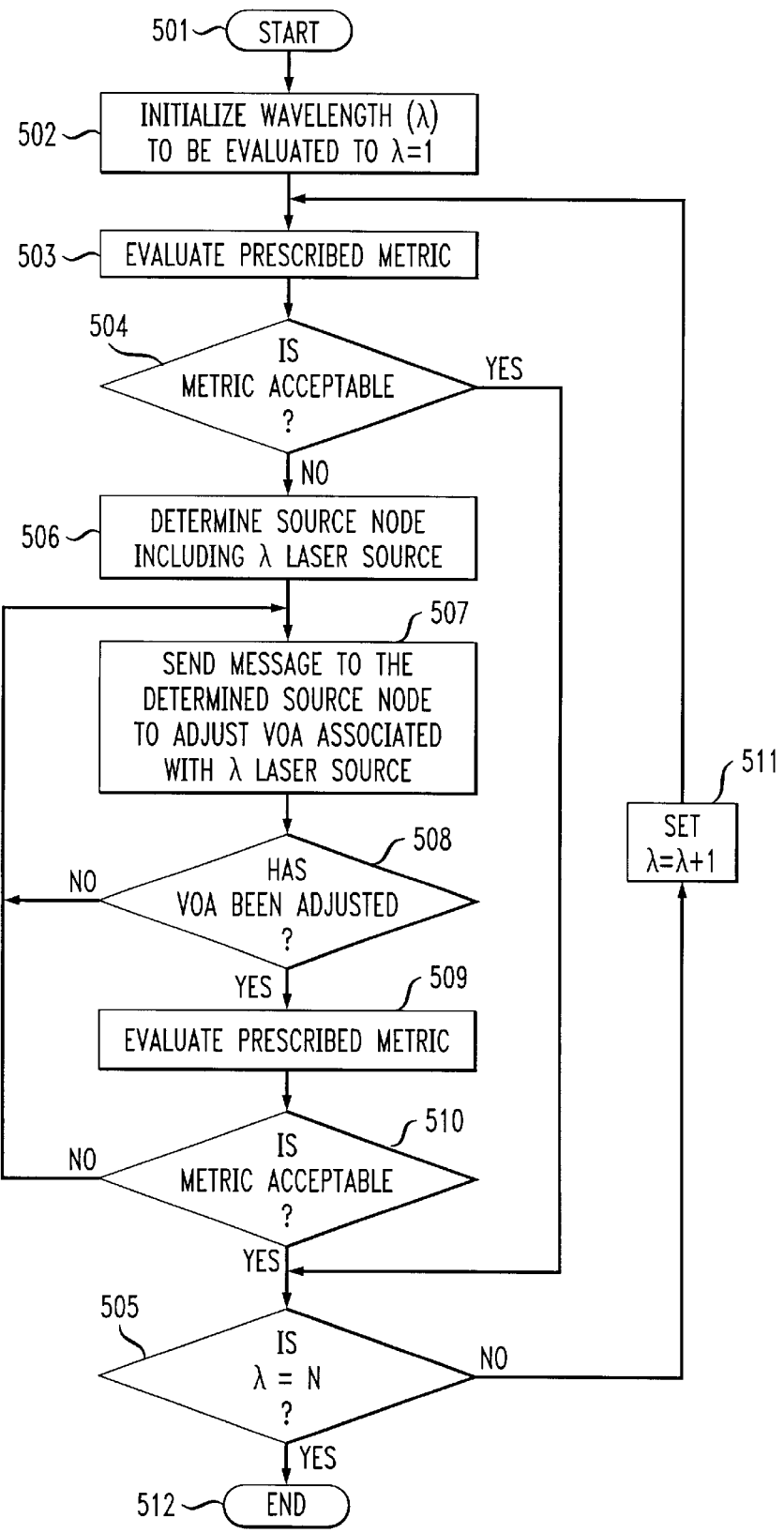
FIG. 5 is a flow chart illustrating the steps used in implementing optical channel optimization in the embodiment of the invention employing the optical node of FIG. 2.

FIG. 5 is a flow chart illustrating the steps used in implementing optical channel optimization in the embodiment of the invention employing the optical node of FIG. 2. Specifically, the performance monitoring process of the optical channels is started in step 501. If should be noted that the monitoring process may be initiated by a user via user unit 211 (FIG. 1) supplying an appropriate initiation signal to controller 205 or automatically in response to detection of some performance metric being outside acceptable criteria, for example, some characteristic limit or threshold value, that could include upper and lower limits, or the like. Step 502 initializes to an optical channel, i.e., wavelength, to be performance monitored, i.e., evaluated. In this example, the wavelength is set to λ=1. Thereafter, step 503 evaluates a prescribed performance metric of the wavelength. As indicated, the metric being evaluated may be bit-error-rate (BER), signal-to-noise (S/N) ratio, cross talk or the like. It is noted that if the predetermined metric being evaluated is cross talk that an optical spectrum analyzer may be advantageously employed in monitor 212 (FIG. 2), and terminal equipment 203 as shown in FIG. 3 would be employed to supply the incoming optical channels, i.e., wavelengths λ, to monitor 212. By way of an example, cross talk is measured by employing an optical spectrum analyzer (OSA), which yields a measurement of the average power spectrum of an incoming optical channel. The spectral region of interest is selected by the MUX and DEMUX filters at the remote node at which the optical originated. These filters have a finite bandwidth, chosen to encompass the entire spectral range that carries the optical channel being evaluated. It is these filters that allow transmission of the undesired cross talk that is manifested by a perturbation in the measured optical spectrum. Usually, the largest contributors of cross talk are caused by optical channel sources adjacent to the optical source for the optical channel under evaluation. However, it is possible that other, nearby optical sources may also contribute cross talk. In such an instance, the measured spectral region can be widened to capture such nearby optical sources. Then, control is passed to step 504 that tests to determine whether the predetermined metric is within acceptable criteria. If the test result in step 504 is YES, control is transferred to step 505. If the test result in step 504 is NO, step 506 determines the source node including the optical channel, i.e., λ laser source, being monitored. This is readily realized by employing a map, typically stored in controller 205 (FIG. 2), of the originating and terminating nodes of the optical channel, i.e., wavelength λ, or optical channels, i.e., wavelengths $λ_N$, being evaluated. Step 507 causes a message to be sent to the determined source node, in this example, via a control message in an optical supervisory channel, in order to adjust a VOA associated with the λ laser source. Then, step 508 determines whether the associated VOA has been adjusted. This may be realized by the node including the λ laser source sending an acknowledge message via the optical supervisory channel to the node that is monitoring the performance of the optical channel. If the test result in step 508 is NO, control is returned to step 507 and steps 507 and 508 are iterated until step 508 yields a YES result and an acknowledgment that the associated VOA has been adjusted. Upon step 508 yielding a YES result, step 509 evaluates the predetermined metric being monitored. Then, step 510 tests to determine whether the metric is within acceptable criteria. If the test result in step 510 is NO, control is returned to step 507 and appropriate ones of steps 507 through 510 are iterated until step 510 yields a YES result. Upon step 510 yielding a YES result, control is also transferred to step 505. Step 505 tests to determine if the λ=N, i.e., whether the last λ in a set has been evaluated. If the test result in step 505 is NO, step 511 sets λ=λ+1 and control is returned to step 503. Thereafter, appropriate ones of steps 503 through 511 are iterated until step 505 yields a YES result. Then, the process is ended in step 512. In this manner the optimization process effectively optimizes the one or more optical channels in essentially real time.

FIG. 6 illustrates, in simplified block diagram form, details of another optical node, including an embodiment of the invention, that may be employed in the system of FIG. 1. The elements of the optical node of FIG. 6 that are identical to those of the optical node of FIG. 2 have been similarly numbered and will not be described again. The differences between the optical node of FIG. 2 and the optical node of FIG. 6 are the use of so-called local VOA 601 and so-called local VOA 602 in the incoming optical paths 202 and 207, respectively. VOA 601 and VOA 602 are controlled in response to appropriate control messages from controller 205.

Figure 7:
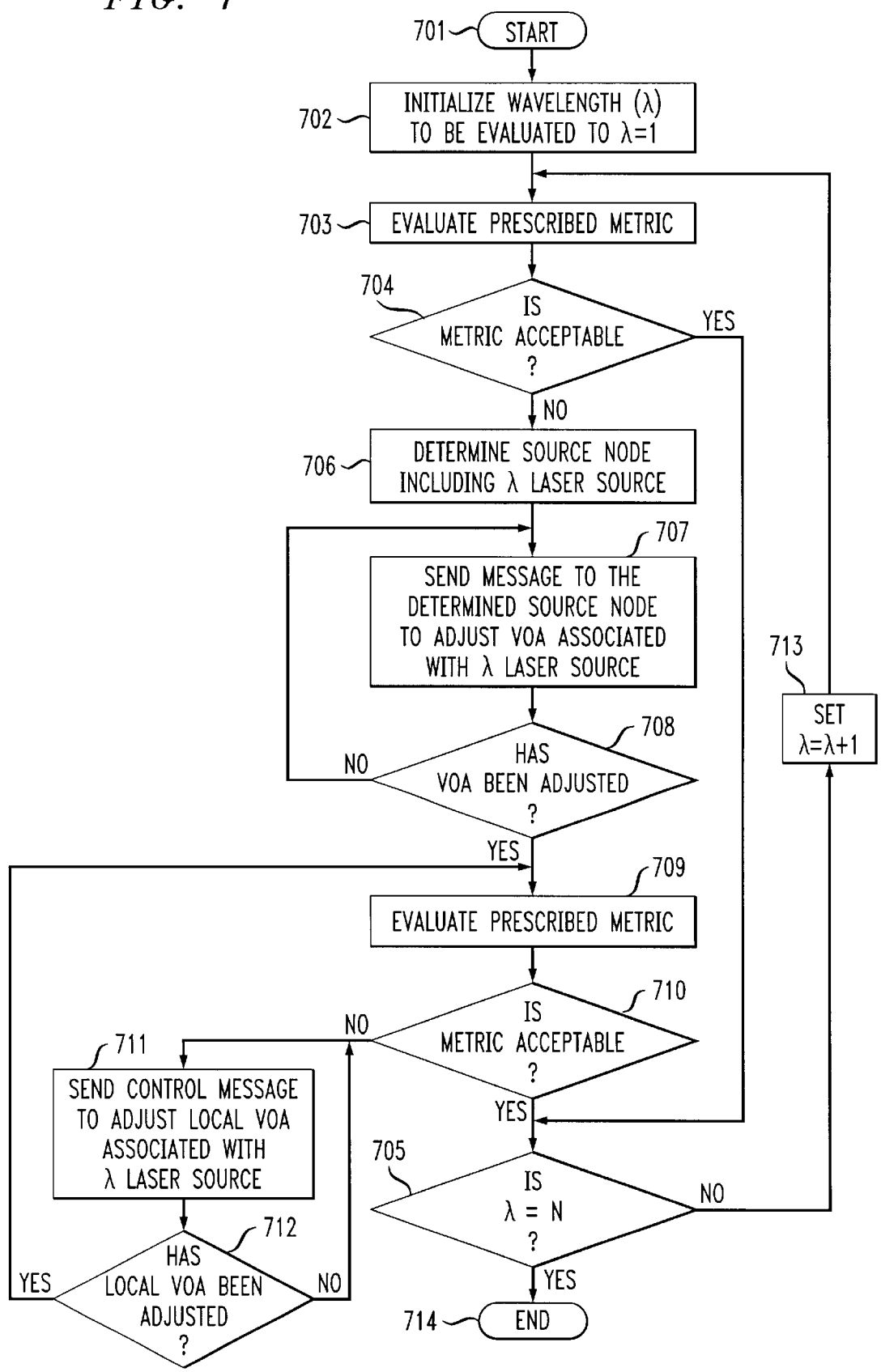
FIG. 7 is a flow chart illustrating the steps used in implementing one process for optical channel optimization in the embodiment of the invention employing the optical node of FIG. 6.

FIG. 7 is a flow chart illustrating the steps used in one process for implementing optical channel optimization in the embodiment of the invention employing the optical node of FIG. 6. Specifically, the performance monitoring process of the optical channels is started in step 701. If should be noted that the monitoring process may be initiated by a user via user unit 211 (FIG. 1) supplying an appropriate initiation signal to controller 205 or automatically in response to detection of some performance metric being outside acceptable criteria. Step 702 initializes to an optical channel, i.e., wavelength, to be performance monitored, i.e., evaluated. In this example the wavelength is set to λ=1. Thereafter, step 703 evaluates a prescribed performance metric of the wavelength, as described above in relationship to FIG. 5.

Step 704 tests to determine whether the predetermined metric is within acceptable criteria. If the test result in step 704 is YES, control is transferred to step 705. If the test result in step 704 is NO, step 706 determines the source node including the optical channel, i.e., λ laser source, being monitored, as described above in relationship to FIG. 5. Step 707 causes a message to be sent to the determined source node, in this example, via a control message in an optical supervisory channel, in order to adjust a VOA associated with the λ laser source at a remote node. Then, step 708 determines whether the associated VOA has been adjusted. This may be realized by the node including the λ laser source sending an acknowledge message via the optical supervisory channel to the node that is monitoring the performance of the optical channel. If the test result in step 708 is NO, control is returned to step 707 and steps 707 and 708 are iterated until step 708 yields a YES result and an acknowledgment that the associated remote VOA has been adjusted. It should be noted that the adjustment of the remote VOA should significantly optimize the predetermined metric being monitored. Upon step 708 yielding a YES result, step 709 evaluates the predetermined metric being monitored. Then, step 710 tests to determine whether the predetermined metric is within acceptable criteria. If the test result in step 710 is NO, control is returned is passed to step 711 which causes a control message to be sent to a local VOA, for example, VOA 601, associated with the k source being monitored. Then, step 712 tests to determine if the local VOA has been adjusted. If the test result in step 712 is NO, control is returned to step 711 and steps 711 and 712 are iterated until step 712 yields a YES result. Thereafter, control is returned to step 709 and steps 709 through 712 are iterated until step 710 yields a YES result. Upon step 710 yielding a YES result, control is also transferred to step 705. Step 705 tests to determine if the λ=N, i.e., whether last λ in a set has been evaluated. If the test result in step 705 is NO, step 713 sets λ=λ+1 and control is returned to step 703. Thereafter, appropriate ones of steps 703 through 713 are iterated until step 705 yields a YES result. Then, the process is ended in step 714.

Thus, it is seen that in the embodiment of FIG. 6, an adjustment of the remote VOA associated with the λ laser source being monitored is first made. Thereafter, if necessary, a local VOA associated with the λ laser source being monitored is adjusted until the predetermined metric being monitored is optimized. In this manner the optimization process effectively optimizes the one or more optical channels in essentially real time.

It should be noted that although in the process described in FIG. 7, the remote VOA is adjusted first and the local VOA is adjusted therefore, it will be apparent that the local VOA could equally be adjusted first and the remote VOA thereafter. Indeed, any desired adjustment scheme could be employed. For example, adjustments could alternate between the local and remote VOAs.

Figure 8:
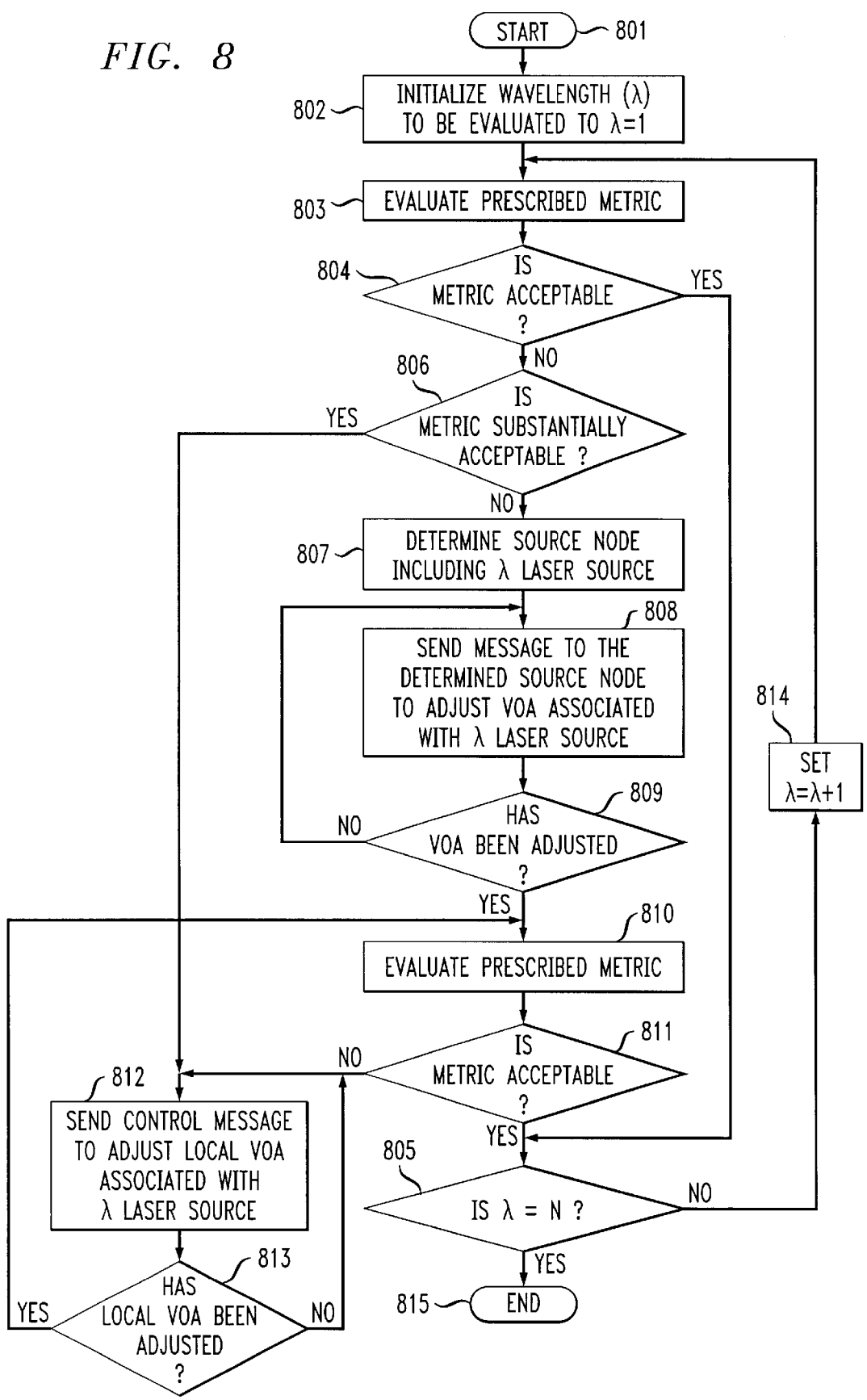
FIG. 8 is a flow chart illustrating the steps used in implementing another process for optical channel optimization in the embodiment of the invention employing the optical node of FIG. 6.

FIG. 8 is a flow chart illustrating the steps used in another process for implementing optical channel optimization in the embodiment of the invention employing the optical node of FIG. 6. Specifically, the performance monitoring process of the optical channels is started in step 801. If should be noted that the monitoring process may be initiated by a user via user unit 211 (FIG. 1) supplying an appropriate initiation signal to controller 205 or automatically in response to detection of some performance metric being outside acceptable criteria. Step 802 initializes to an optical channel, i.e., wavelength, to be performance monitored, i.e., evaluated. In this example the wavelength is set to λ=1. Thereafter, step 803 evaluates a prescribed performance metric of the wavelength, as described above in relationship to FIG. 5. Step 804 tests to determine whether the predetermined metric is within acceptable criteria. If the test result in step 804 is YES, control is transferred to step 805. If the test result in step 804 is NO, step 806 determines it the metric being monitored is substantially acceptable. That is, step 806 determines whether or not the metric is within a prescribed boundary for the metric being monitored. In effect, this step 806 determines, in effect, whether a significant or, merely, a finer adjustment is required to optimize the optical channel. If the test result in step 806 is YES only a trimming up type adjust may be required and control is transferred to step 812. If the test result in step 806 is NO, a more significant adjustment may be required and control is transferred to step 807. Step 807 determines the source node including the optical channel, i.e., λ laser source, being monitored, as described above in relationship to FIG. 5. Step 808 causes a message to be sent to the determined source node, in this example, via a control message in an optical supervisory channel, in order to adjust a VOA associated with the λ laser source at a remote node. Then, step 809 determines whether the associated VOA has been adjusted. This may be realized by the node including the λ laser source sending an acknowledge message via the optical supervisory channel to the node that is monitoring the performance of the optical channel. If the test result in step 809 is NO, control is returned to step 808 and steps 808 and 809 are iterated until step 809 yields a YES result and an acknowledgment that the associated remote VOA has been adjusted. It should be noted that the adjustment of the remote VOA should significantly optimize the prescribed metric being monitored. Upon step 809 yielding a YES result, step 810 evaluates the prescribed metric being monitored. Then, step 811 tests to determine whether the prescribed metric is within acceptable criteria. If the test result in step 811 is NO, control is returned is passed to step 812 which causes a control message to be sent to a local VOA, for example, VOA 601, associated with the λ source being monitored. Then, step 813 tests to determine if the local VOA has been adjusted. If the test result in step 813 is NO, control is returned to step 812 and steps 813 and 813 are iterated until step 813 yields a YES result. Thereafter, control is returned to step 810 and steps 810 through 813 are iterated until step 811 yields a YES result. Upon step 811 yielding a YES result, control is also transferred to step 805. Step 805 tests to determine if the λ=N, i.e., whether last λ in a set has been evaluated. If the test result in step 805 is NO, step 814 sets λ=λ+1 and control is returned to step 803. Thereafter, appropriate ones of steps 803 through 814 are iterated until step 805 yields a YES result. Then, the process is ended in step 815.

Thus, it is seen that in the embodiment of FIG. 6, the process illustrated in FIG. 8 may cause an adjustment to be first made of the remote VOA associated with the λ laser source being monitored and thereafter, if necessary, a local VOA associated with the λ laser source being monitored is adjusted until the prescribed metric being monitored is optimized. Alternatively, under certain condition it may only be necessary to adjust only one of the VOAs, for example, only the local VOA may be adjusted or only the remote VOA may be adjusted. In this manner the optimization process effectively optimizes the one or more optical channels in essentially real time.

Figure 9:
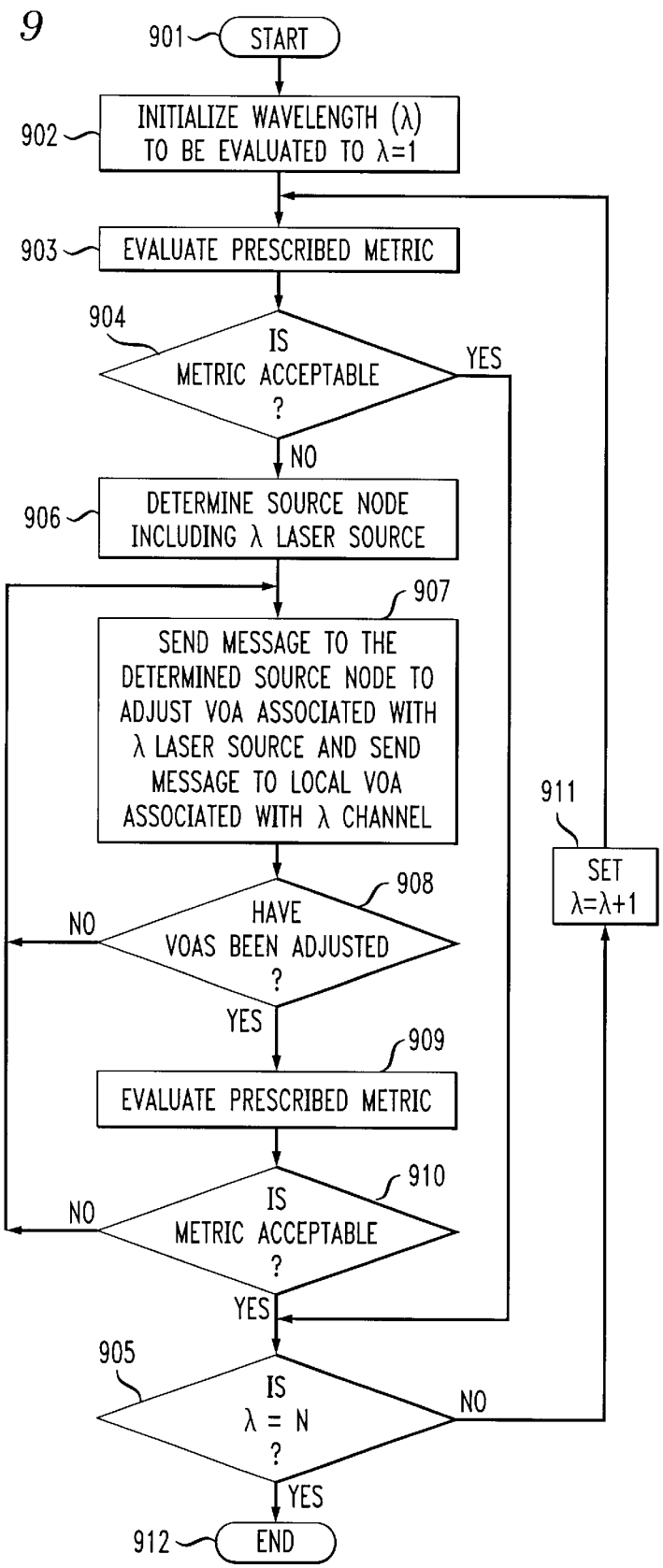
FIG. 9 is a flow chart illustrating the steps used in implementing yet another process for optical channel optimization in the embodiment of the invention employing the optical node of FIG. 6.

FIG. 9 is a flow chart illustrating the steps used in yet another process for implementing optical channel optimization in the embodiment of the invention employing the optical node of FIG. 6. Specifically, the performance monitoring process of the optical channels is started in step 901. If should be noted that the monitoring process may be initiated by a user via user unit 211 (FIG. 1) supplying an appropriate initiation signal to controller 205 or automatically in response to detection of some performance metric being outside acceptable criteria. Step 902 initializes to an optical channel, i.e., wavelength, to be performance monitored, i.e., evaluated. In this example the wavelength is set to λ=1. Thereafter, step 903 evaluates a prescribed performance metric of the wavelength, as described above in relationship to FIG. 5. Step 904 tests to determine whether the prescribed metric is within acceptable criteria. If the test result in step 904 is YES, control is transferred to step 905. If the test result in step 904 is NO, step 906 determines the source node including the optical channel, i.e., λ laser source, being monitored, as described above in relationship to FIG. 5. Step 907 causes a message to be sent to the determined source node, in this example, via a control message in an optical supervisory channel, in order to adjust a VOA associated with the λ laser source at a remote nod and a message to be sent to adjust a local VOA associated with the optical channel being monitored. Thus, it is seen that in this embodiment the remote VOA and the local VOA are adjusted simultaneously. Then, step 908 determines whether the associated VOAs have been adjusted. This may be realized by the node including the λ laser source sending an acknowledge message via the optical supervisory channel to the node that is monitoring the performance of the optical channel. The node including the local VOA makes its own determination if the local VOA has been adjusted. If the test result in step 908 is NO, control is returned to step 907 and steps 907 and 908 are iterated until step 908 yields a YES result and acknowledgments that the associated VOAs have been adjusted. It should be noted that the adjustment of the remote VOA should significantly optimize the prescribed metric being monitored. Upon step 908 yielding a YES result, step 909 evaluates the prescribed metric being monitored. Then, step 910 tests to determine whether the prescribed metric is within acceptable criteria. If the test result in step 910 is NO, control is returned is returned to step 907 and steps 907 through 910 are iterated until step 910 yields a YES result. Upon step 910 yielding a YES result, control is also transferred to step 905. Step 905 tests to determine if the λ=N, i.e., whether last λ in a set has been evaluated. If the test result in step 05 is NO, step 911 sets λ=λ+1 and control is returned to step 903. Thereafter, appropriate ones of steps 903 through 911 are iterated until step 905 yields a YES result. Then, the process is ended in step 912.

Thus, it is seen that in the embodiment of FIG. 6, via the process illustrated in FIG. 9, both the remote VOA and local VOA are adjusted simultaneously. In this manner the optimization process effectively optimizes the one or more optical channels in essentially real time.

It should be further noted, that if the simultaneous adjustment of both the remote VOA and local VOA does not yield a desired optimization of the optical channel one or more of the processes described above in relationship with FIGS. 5, 7 and 8 made be utilized, as desired. For example, after the simultaneous adjustment of the remote and local VOAs, if it were desirable only to further adjust the remote VOA, steps 507 through 510 of FIG. 5 could be used. Similarly, if it were desirable only to further adjust the local VOA, steps 709 through 712 of FIG. 7 could be used. Finally, if it were desirable to further adjust the remote VOA, the local VOA or both VOAs, steps 806 though 813 of FIG. 8 could be used.

The above-described embodiments are, of course, merely illustrative of the principles of the invention. Indeed, numerous other methods or apparatus may be devised by those skilled in the art without departing from the spirit and scope of the invention. For example, the particular order that the local and remote VOAs associated with a particular optical channel are adjusted may vary from application to application.

What is claimed is:

1. A method for use in an optical transmission system for optimizing optical channel performance comprising the steps of:

(a) selecting a received prescribed optical channel having a prescribed optical wavelength;

(b) a first step of evaluating a predetermined transmission performance metric of said selected prescribed optical channel;

(c) a first step of determining if said prescribed metric under evaluation is within acceptable criteria;

(d) if not, generating a first control message to adjust at least a first controllable optical power adjustment unit associated with said selected prescribed optical channel;

(e) supplying said first control message to cause said first controllable power adjustment unit to adjust in such a manner as to optimize said prescribed metric of said selected prescribed optical channel;

(f) a second step of evaluating said predetermined transmission performance metric of said selected optical channel;

(g) a second step of determining if said prescribed metric under evaluation is within acceptable criteria, and (h) if not, repeating steps (d) through (h) until said prescribed metric is within acceptable criteria;

(i) determining if said selected prescribed optical channel having been optimized is the last of said one or more optical channels and, if not, (i) selecting another prescribed optical channel having another prescribed optical wavelength; and repeating steps (b) through (i) until step (h) indicates that the last one of said selected prescribed optical channels has been optimized.

2. The method as defined in claim 1 wherein said at least first controllable optical power adjustment unit is a first variable optical attenuator, and further including a step of utilizing said first control message to adjust an attenuation value of said first variable optical attenuator in a direction toward bringing said prescribed metric under evaluation within said acceptable criteria.

3. The method as defined in claim 1 further including steps of determining if said first controllable optical power adjustment unit has been adjusted and, if not, supplying said first control message and determining whether said first controllable optical power adjustment unit has been adjusted, until it is determined that said first controllable optical power adjustment unit has been adjusted.

4. The method as defined in claim 1 further including the steps of, (r) if said first step of determining indicates that said metric is not within acceptable criteria, determining a source node including a laser source for said prescribed optical wavelength of said selected prescribed optical channel, said first controllable power adjustment unit being associated with said prescribed optical wavelength laser source, (s) a second step of evaluating said predetermined transmission performance metric, (t) a second step of determining if said predetermined transmission performance metric is within said prescribed criteria, (u) if the result of step (t) is NO, generating a second control message, (v) supplying said second control message to adjust a second controllable power unit associated with said selected prescribed optical channel toward optimizing said predetermined transmission performance metric.

5. The method as defined in claim 4 further including repeating steps (s) through (v) until said prescribed metric is within said acceptable criteria.

6. The method as defined in claim 5 wherein said optical transmission system transports one or more optical channels each having a prescribed wavelength, and further including steps of (w) determining if said prescribed optical channel having been optimized is the last of said one or more optical channels and, if not, (x) selecting another prescribed optical channel having another prescribed optical wavelength and repeating steps (b) through (e) and (r) through (x) until step (w) indicates that the last one of said prescribed optical channels has been optimized.

7. The method as defined in claim 4 wherein said at least first controllable optical power adjustment unit is a first variable optical attenuator and said at least second controllable power adjustment unit is a second variable optical attenuator, and further including a steps of utilizing said first control message to adjust an attenuation value of said first variable optical attenuator in a direction toward bringing said prescribed metric under evaluation within said acceptable criteria and utilizing said second control message to adjust an attenuation value of said second variable optical attenuator in a direction toward bringing said prescribed metric within said acceptable criteria.

8. The method as defined in claim 1 further including the steps of, (aa) a second step of evaluating said predetermined transmission performance metric, (bb) a second step of determining if said predetermined transmission performance metric is within said prescribed criteria, (cc) if the result of step (dd) is NO, determining a source node including a laser source for said prescribed optical wavelength of said selected prescribed optical channel, (ee) generating a second control message, (ff) transmitting said second control message to adjust a second controllable power unit associated with said prescribed optical wavelength laser source toward optimizing said predetermined transmission performance metric.

9. The method as defined in claim 8 further including repeating steps (aa) through (ff) until said prescribed metric is within said acceptable criteria.

10. The method as defined in claim 9 wherein said optical transmission system transports one or more optical channels each having a prescribed wavelength, and further including steps of (gg) determining if said prescribed optical channel having been optimized is the last of said one or more optical channels and, if not, (hh) selecting another prescribed optical channel having another prescribed optical wavelength and repeating steps (b) through (e), (r) and (aa) through (hh) until step (gg) indicates that the last one of said prescribed optical channels has been optimized.

11. The method as defined in claim 8 wherein said at least first controllable optical power adjustment unit is a first variable optical attenuator and said at least second controllable power adjustment unit is a second variable optical attenuator, and further including a steps of utilizing said first control message to adjust an attenuation value of said first variable optical attenuator in a direction toward bringing said prescribed metric under evaluation within said acceptable criteria and utilizing said second control message to adjust an attenuation value of said second variable optical attenuator in a direction toward bringing said prescribed metric within said acceptable criteria.

12. A method for use in an optical transmission system for optimizing optical channel performance comprising the steps of:
(a) selecting a received prescribed optical channel having a prescribed optical wavelength;
(b) a first step of evaluating a predetermined transmission performance metric of said selected prescribed optical channel;
(c) a first step of determining if said prescribed metric under evaluation is within acceptable criteria;
(d) if not, generating a first control message to adjust at least a first controllable optical power adjustment unit associated with said selected prescribed optical channel;
(e) supplying said fit control message to cause said first controllable power adjustment unit to adjust in such a manner as to optimize said prescribed metric of said selected prescribed optical channel; and
(k) if said first step of determining indicates that said metric is not within acceptable criteria, determining a source node including a laser source for said prescribed optical wavelength of said selected prescribed optical channel.

13. The method as defined in claim 12 further including steps of (l) inserting said first control message in a prescribed optical channel and (m) transmitting said prescribed optical channel to said source node.

14. The method as defined in claim 13 wherein said prescribed optical channel is a supervisory optical channel.

15. The method as defined in claim 13 wherein said prescribed optical channel includes an overhead portion and wherein said first control message is inserted into a field in said overhead portion of said prescribed optical channel.

16. The method as defined in claim 13 wherein said first controllable power adjustment unit includes a first variable optical attenuator, and further includes steps of (n) receiving said prescribed optical channel and (o) utilizing said first control message to adjust an attenuation value of said first variable optical attenuator in a direction toward optimizing performance of said selected prescribed optical channel.

17. The method as defined in claim 16 wherein said optical transmission system transports one or more optical channels each having a prescribed wavelength, and further including steps of (p) determining if said selected prescribed optical channel having been optimized is the last of said one or more optical channels and, if not, (q) selecting another prescribe optical channel having another prescribed optical wavelength and repeating steps (b) through (e) and (k) through (q) until step (p) indicates that the last one of said selected prescribed optical channels has been optimized.

18. The method as defined in claim 17 further including steps of determining if said first variable optical attenuator has been adjusted and, if not, transmitting said first control message and determining whether said first variable optical attenuator has been adjusted, until it is determined that said first variable optical attenuator has been adjusted.

19. A method for use in an optical transmission system for optimizing optical channel performance comprising the steps of:
(a) selecting a received prescribed optical channel having a prescribed optical wavelength;
(b) a first step of evaluating a predetermined transmission performance metric of said prescribed optical channel;
(c) a first step of determining if said prescribed metric under evaluation is within acceptable criteria;
(d) if the result of step (c) is NO, a second step of determining if said predetermined transmission performance metric is substantially within said acceptable criteria;

(e) if the result of step (d) is NO, determining a source node including a laser source for said prescribed optical wavelength of said prescribed optical channel;

(f) generating a first control message to adjust at least a first controllable optical power adjustment unit associated with said determined laser source; and (g) transmitting said first control message to said source node to cause said first controllable power adjustment unit to adjust in such a manner as to optimize said prescribed metric of said prescribed optical channel.

20. The method as defined in claim 19 wherein if the result of step (d) is YES, (h) generating a second control message to adjust at least a second controllable optical power adjustment unit associate with said selected received optical channel, and (i) supplying said second control message to adjust said at least second controllable power adjustment unit in such a manner as to optimize said prescribed metric.

21. The method as defined in claim 20 further including steps of (j) a second step of determining if said prescribed metric under evaluation is within acceptable criteria, and if the result of step (j) is NO, (k) repeating steps (h) through (j) until step (j) yields a YES result.

22. The method as defined in claim 21 wherein said at least first controllable optical power adjustment unit is a first variable optical attenuator and said at least second controllable power adjustment unit is a second variable optical attenuator, and further including a steps of utilizing said first control message to adjust an attenuation value of said first variable optical attenuator in a direction toward bringing said prescribed metric under evaluation within said acceptable criteria and utilizing said second control message to adjust an attenuation value of said second variable optical attenuator in a direction toward bringing said prescribed metric within said acceptable criteria.

23. A method for use in an optical transmission system for optimizing optical channel performance comprising the steps of:

(a) selecting a received prescribed optical channel having a prescribed optical wavelength;

(b) a first step of evaluating a predetermined transmission performance metric of said prescribed optical channel;

(c) a first step of determining if said prescribed metric under evaluation is within acceptable criteria;

(d) if the result of step (e) is NO, determining a source node including a laser source for said prescribed optical wavelength of said prescribed optical channel;

(e) generating a first control message to adjust a first controllable optical power adjustment unit associated with said determined laser source;

(f) generating a second control message to adjust at least a second controllable optical power adjustment unit associated with said selected received prescribed optical channel;

(g) transmitting said first control message to said source node to cause said first controllable power adjustment unit to adjust in such a manner as to optimize said prescribed metric of said prescribed optical channel; and (h) supplying said second control message substantially simultaneously with said transmission of said first control message to adjust said at least second controllable unit in such a manner as to optimize said predetermine metric of said prescribed optical channel.

24. The method as defined in claim 23 wherein said step of transmitting and said step of supplying are effected substantially simultaneously.

25. The method as defined in claim 24 further including steps of (i) a second step of determining if said prescribed metric under evaluation is within acceptable criteria, and if the result of step (i) is NO, (j) repeating steps (e) through (i) until step (i) yields a YES result.

26. The method as defined in claim 24 wherein said at least first controllable optical power adjustment unit is a first variable optical attenuator and said at least second controllable power adjustment unit is a second variable optical attenuator, and further including a steps of utilizing said first control message to adjust an attenuation value of said first variable optical attenuator in a direction toward bringing said prescribed metric under evaluation within said acceptable criteria and utilizing said second control message to adjust an attenuation value of said second variable optical attenuator in a direction toward bringing said prescribed metric within said acceptable criteria.

27. Apparatus for use in an optical transmission system for optimizing optical channel performance comprising:

an optical demultiplexer for obtaining one or more received prescribed optical channels each having a different optical wavelength;

a monitor for evaluating a prescribed performance metric of said one or more received prescribed optical channels and for determining whether said prescribed performance metric being evaluated for a selected one of said prescribed optical channels is within acceptable criteria; and a controller, responsive to an indication from said monitor that said prescribed performance metric is not within said prescribed criteria, for generating a control message to control adjustment of a first controllable optical power adjustment unit associated with said selected prescribed optical channel toward bringing said prescribed metric within said acceptable criteria, and supplying said first control message to said first controllable optical power adjustment unit associated with said selected prescribed optical channel, whereby transmission performance of said selected prescribed optical channel is optimized, wherein said controller is equipped to determine a source node including a laser source of said prescribed optical wavelength of said selected prescribed optical channel.

28. The invention as defined in claim 27 wherein said first controllable optical power adjustment unit is a first variable optical attenuator being response to said first control message to adjust an attenuation value of said first variable attenuator in a direction toward bringing said prescribed metric under evaluation within said acceptable criteria.

29. The invention as defined in claim 27 further including an optical multiplexer for multiplexing said first control message into an optical signal to be transmitting to said source node.

30. The invention as defined in claim 29 wherein said controller is further equipped to insert said control message into an optical supervisory channel and wherein said multiplexer multiplexes said optical supervisory channel into said optical signal.

31. The method as defined in claim 29 wherein said prescribed optical channel includes an overhead portion and wherein said controller is further equipped to insert said first control message into a field in said overhead portion of said prescribed optical channel.

32. The invention as defined in claim 27 further including a second controllable optical power unit associated with said received prescribed optical channel.

33. The invention as defined in claim 32 wherein said controller, in response to the results of said evaluating and determining whether said prescribed metric is within acceptable criteria, generates a second control message for controlling said second controllable optical power adjustment unit in a manner toward bringing said prescribed metric within said acceptable criteria.

34. The invention as defined in claim 33 wherein said first controllable optical power adjustment unit is a first variable optical attenuator and said second controllable optical power adjustment unit is a second variable optical attenuator.

35. The invention as defined in claim 34 wherein said first variable optical attenuator is in associated with a laser source at a source node, said controller being responsive to an indication from said monitor that said prescribed metric is not within said acceptable criteria, determining a source node including a laser source associated with said selected prescribed optical channel and said optical multiplexer transmitting said first control message in an optical signal to said source node for controlling said first optical attenuator.

36. The invention as defined in claim 35 wherein an attenuation value of said first variable optical attenuator is adjusted in response to said first control message toward bringing said prescribed metric within said acceptable criteria and an attenuation value of said second variable optical attenuator is adjusted in response to said second control message toward bringing said prescribed metric within said acceptable criteria.

37. Apparatus for use in an optical transmission system including a plurality of nodes for optimizing transmission performance of optical channels being transported in the system comprising:

at a first node a first optical demultiplexer for obtaining one or more prescribed optical channels each having a different optical wavelength, a monitor for evaluating a prescribed performance metric of said one or more prescribed optical channels and for determining whether said prescribed performance metric being evaluated for said a prescribed one of said optical channels is within acceptable criteria, a first controller for determining a source node including a laser source for said prescribed optical wavelength of said prescribed optical channel when said performance metric being evaluated is not within said acceptable criteria and for generating a control message to control adjustment of a first controllable optical power adjustment unit associated with said laser source toward bringing said prescribed metric within said acceptable criteria, and a first optical multiplexer for multiplexing said first control message into an optical signal to be transmitted to said source node; and at said source node a second optical demultiplexer for obtaining a first control message from an incoming optical signal, a laser source for generating a prescribed optical wavelength for a prescribed optical channel, a second controller supplied with said first control message for generating an adjustment control message, and a first controllable optical power adjustment unit associated with said laser source and being responsive to said control message to adjust output light power from said laser source in a direction toward optimizing a predetermined performance metric for said prescribed optical channel, whereby said performance of said prescribed optical channel is optimized.

38. The invention as defined in claim 37 wherein said fire controller is equipped to insert said first control message into an optical supervisory channel and wherein said first multiplexer multiplexes said optical supervisory channel into said optical signal.

39. The invention as defined in claim 38 further including at said first node a second controllable optical power unit associated with said prescribed optical channel.

40. The invention as defined in claim 39 wherein said first controller in response to the results of said evaluating and determining whether said prescribed metric is within acceptable criteria generates a second control message for controlling said second controllable optical power adjustment unit in a manner toward bring said prescribed metric within said acceptable criteria.

41. The invention as defined in claim 40 wherein said second controllable optical power adjustment unit is a second variable optical attenuator.

42. The invention as defined in claim 41 wherein an attenuation value of said second variable optical attenuator is adjusted in response to said second control message toward bringing said prescribed metric within acceptable criteria.

43. The invention as defined in claim 37 wherein said first controllable optical power adjustment unit is a first variable optical attenuator.

44. The invention as defined in claim 43 wherein an attenuation value of said first variable optical attenuator is adjusted in response to said first control message toward bringing said prescribed metric within acceptable criteria.

* * * * *